United States Patent
Yokota et al.

(10) Patent No.: US 9,688,834 B2
(45) Date of Patent: Jun. 27, 2017

(54) NBR COMPOSITION AND RUBBER-METAL LAMINATE

(75) Inventors: Atsushi Yokota, Fujisawa (JP); Toshihiro Higashira, Fujisawa (JP)

(73) Assignee: NOK Corporation, Tokyo (JP)

( * ) Notice: Subject to any disclaimer, the term of this patent is extended or adjusted under 35 U.S.C. 154(b) by 756 days.

(21) Appl. No.: 14/005,529

(22) PCT Filed: Mar. 6, 2012

(86) PCT No.: PCT/JP2012/055626
§ 371 (c)(1),
(2), (4) Date: Sep. 16, 2013

(87) PCT Pub. No.: WO2012/132779
PCT Pub. Date: Oct. 4, 2012

(65) Prior Publication Data
US 2014/0004363 A1  Jan. 2, 2014

(30) Foreign Application Priority Data
Mar. 31, 2011 (JP) ................. 2011-078990

(51) Int. Cl.
*C08K 3/04* (2006.01)
*C08K 5/40* (2006.01)
*C08K 5/47* (2006.01)
*C08K 5/00* (2006.01)
*B32B 7/12* (2006.01)
*B32B 15/06* (2006.01)
*B32B 15/18* (2006.01)
*B32B 25/16* (2006.01)

(52) U.S. Cl.
CPC .................. *C08K 3/04* (2013.01); *B32B 7/12* (2013.01); *B32B 15/06* (2013.01); *B32B 15/18* (2013.01); *B32B 25/16* (2013.01); *C08K 5/0025* (2013.01); *C08K 5/40* (2013.01); *C08K 5/47* (2013.01); *B32B 2255/06* (2013.01); *B32B 2255/26* (2013.01); *B32B 2307/538* (2013.01); *B32B 2307/554* (2013.01); *B32B 2307/584* (2013.01); *B32B 2307/752* (2013.01); *B32B 2581/00* (2013.01); *Y10T 428/31696* (2015.04)

(58) Field of Classification Search
None
See application file for complete search history.

(56) References Cited

U.S. PATENT DOCUMENTS

| | | | | |
|---|---|---|---|---|
| 2002/0188082 A1* | 12/2002 | Nakata | ................... | C08G 75/14 525/332.4 |
| 2009/0062444 A1* | 3/2009 | Moritani | .................. | C08K 5/14 524/284 |
| 2011/0040037 A1* | 2/2011 | Kawasaki | ............ | C08K 5/5419 525/105 |

FOREIGN PATENT DOCUMENTS

JP    200818707    1/2008

* cited by examiner

*Primary Examiner* — Alexandre Ferre
(74) *Attorney, Agent, or Firm* — K. David Crockett, Esq.; Paul J. Baskofen, Esq.; Crockett & Crockett, PC

(57) ABSTRACT

An NBR composition including an NBR polymer, a vulcanizing agent, a vulcanizing accelerator, and carbon black, wherein the carbon black includes a combination of MT carbon black and carbon black having an iodine absorption number of 20 mg/g or less and a DBP absorption number of 40 cm$^3$/100 g or more, and has a total added amount of 110 to 250 parts by weight based on 100 parts by weight of the NBR polymer, and the amount of the MT carbon black is larger than that of the carbon black having an iodine absorption number of 20 mg/g or less and a DBP absorption number of 40 cm$^3$/100 g or more and the amount of the carbon black having an iodine absorption number of 20 mg/g or less and a DBP absorption number of 40 cm$^3$/100 g or more is 10 to 70 parts by weight based on 100 parts by weight of the NBR polymer, and a metal laminate obtained by laminating the NBR composition.

12 Claims, No Drawings

NBR COMPOSITION AND RUBBER-METAL LAMINATE

TECHNICAL FIELD

The present invention relates to an NBR composition and a rubber metal laminate, and particularly an NBR composition and a rubber metal laminate having both of reinforcement and surface smoothness.

BACKGROUND ART

An NBR composition is laminated on metal and the laminate is crosslinked (vulcanized) to produce a rubber metal laminate. The rubber metal laminate is used as a gasket material.

As crosslinking (vulcanizing) of a rubber composition, press crosslinking (vulcanizing) and crosslinking (vulcanizing) in an oven have been known. In order to improve productivity, an NBR composition capable of undergoing crosslinking (vulcanizing) in an oven, that is, a sulfur-crosslinking NBR composition is required. Further, the NBR composition is required not to generate nitrosoamine during the crosslinking.

This is because nitrosamine is a controlled item under Technische Regeln fur Gefahrstoffe 552 (TRGS552), German Law setting forth technical regulations on dangerous substances, and also a controlled substance in Pollutant Release AND Transfer Register (PRTR), and therefore the movement of decreased use is increased.

Patent Document 1 has solved the problem of occurrence of nitrosamine during crosslinking by using an NBR composition containing sulfur as a crosslinker and at least one sulfur donor compound selected from tetrabenzylthiuram disulfide, tetrakis(2-ethylhexyl)thiuram disulfide, zinc tetrabenzyldithiocarbamate, and 1,6-bis(N,N-dibenzylthiocarbamodithio)hexane as a crosslinking agent.

PRIOR ART DOCUMENT

Patent Document

Patent Document 1: JP-A-2008-18707

DISCLOSURE OF THE INVENTION

Problems to be Solved by the Invention

A rubber metal laminate produced by crosslinking (vulcanizing) in an oven is exposed to a state which does not appear in a product produced by press crosslinking (vulcanizing), and therefore has a problem for use of the laminate as a gasket material.

The crosslinked (vulcanized) surface of a product (rubber metal laminate) produced by crosslinking (vulcanizing) in an oven is uneven. For this reason, adhesion is insufficient in an environment at low contact pressure, for example, at a pressure of about 100 kPa. Therefore, enough sealing properties cannot be obtained due to the unevenness.

It has been found that the unevenness is caused by a reinforcing filler, such as carbon black and white carbon, contained in the composition. However, the reinforcing filler need be added to the composition since the reinforcing filler has an effect of preventing flow and abrasion of rubber layer in an environment at high contact pressure, for example, at a pressure of about 100 MPa.

In addition to an ordinary kneading process, use of a dispersing device such as a three roll mill and a homogenizer can solve the problem of unevenness, but cannot achieve the improvement of productivity which is the original purpose for crosslinking (vulcanizing) in an oven. Further, a shearing action on rubber paste and polymer occurs to convert them into low molecular weight compounds, decreasing the physical properties of rubber.

The present inventors have intensively studied, and found the composition of a rubber metal laminate which provides the same abrasion resistance as in the addition of carbon black such as HAF and FEF used in Patent Document 1, and does not form an uneven surface (has surface smoothness) even when a rubber composition is crosslinked (vulcanized) in an oven. The present invention has been completed.

An object of the present invention is to provide an NBR composition capable of undergoing crosslinking in an oven and having both of reinforcement and surface smoothness and a rubber metal laminate.

Another object of the present invention will be shown below.

Solutions to the Problems

The problems can be solved by the following aspects of the present invention.

1. An acrylonitrile-butadiene rubber (NBR) composition comprising an NBR polymer, a vulcanizing agent, a vulcanizing accelerator, and carbon black, wherein the carbon black includes a combination of MT carbon black and at least one kind of carbon black selected from carbon black having an iodine absorption number of 20 mg/g or less and a dibutyl phthalate (DBP) absorption number of 40 $cm^3/100$ g or more, and is added in a total amount of 110 to 250 parts by weight based on 100 parts by weight of the NBR polymer, the amount of the medium thermal (MT) carbon black is larger than the carbon black having an iodine absorption number of 20 mg/g or less and a DBP absorption number of 40 $cm^3/100$ g or more, and the amount of the carbon black having an iodine absorption number of 20 mg/g or less and a DBP absorption number of 40 $cm^3/100$ g or more is 10 to 70 parts by weight based on 100 parts by weight of the NBR composition.

2. The NBR composition according to claim 1, wherein the total amount of the carbon black was 160 to 220 parts by weight based on 100 parts by weight of the NBR polymer.

3. The NBR composition according to claim 1 or 2, wherein the vulcanizing accelerator is one or more kinds selected from sulfenamide-based vulcanizing accelerators, or one or more kinds selected from sulfenamide-based vulcanizing accelerators and one or more kinds selected from a thiuram-based vulcanizing accelerator, a thiazole-based vulcanizing accelerator, a sulfenamide-based vulcanizing accelerator, zinc tetrabenzyldithiocarbamate, and 1,6-bis(N,N-dibenzylthiocarbamoyldithio)hexane.

4. The NBR composition according to claim 3, wherein the sulfenamide-based vulcanizing accelerator is N-cyclohexyl-2-benzothiazolyl sulfenamide, N-tert-butyl-2-benzothiazolyl sulfenamide, N-oxydiethylene-2-benzothiazolyl sulfenamide, N-tert-butyl-2-benzothiazolyl sulfenamide, or N,N'-dicyclohexyl-2-benzothiazolyl sulfenamide, the thiuram vulcanizing accelerator is tetrabenzyl thiuram disulfide or tetrakis(2-ethylhexyl)thiuram disulfide, and the thiazole-based vulcanizing accelerator is 2-mercaptobenzothiazole, 2-benzothiazolyl disulfide, zinc 2-mercaptobenzothiazole, or a sodium salt of 2-mercaptobenzothiazole.

5. A rubber metal laminate having a rubber layer formed onto one or both sides of a metal plate by using the NBR composition according to any one of claims 1 to 4 as a rubber layer-forming component.

Effects of the Invention

The present invention provides an NBR composition capable of undergoing vulcanizing in an oven and having both of reinforcement and surface smoothness and a rubber metal laminate.

BEST MODE FOR CARRYING OUT THE INVENTION

Hereinafter, embodiments of the present invention will be described.

<NBR Composition>

As an acrylonitrile-butadiene rubber (NBR) polymer, an acrylonitrile-butadiene copolymer rubber having a combined acrylonitrile content of 18 to 48%, and preferably 31 to 42%, and a Mooney viscosity $ML_{1+4}$ (100° C.) of 30 to 85, and preferably 40 to 70, can be preferably used. When the combined acrylonitrile content is less than the range, the adhesion to an adhesive is poor, whereas when it is more than the range, the low-temperature resistance is impaired. When the Mooney viscosity is less than the range, the frictional abrasion resistance is poor, whereas when it is more than the range, the kneading processability is impaired.

As a vulcanizing agent, sulfur or a sulfur donor compound can be used. Preferable examples of a sulfur donor compound may include trithiocyanuric acid and high molecular weight polysulfides.

Sulfur or a sulfur donor compound may be used alone or by mixing two or more kinds, and the amount thereof falls within a range of 0.5 to 5 parts by weight, and preferably 1 to 3 parts by weight based on 100 parts by weight of the NBR polymer.

As a vulcanizing accelerator, one or more kinds selected from sulfenamide-based vulcanizing accelerators without a secondary amine structure, or a combination of one or more kinds selected from sulfenamide-based vulcanizing accelerators without a secondary amine structure and one or more kinds selected from other vulcanizing accelerators without a secondary amine structure can be used.

Examples of the sulfenamide-based vulcanizing accelerator without a secondary amine structure may include N-cyclohexyl-2-benzothiazolyl sulfenamide (CZ), N-tert-butyl-2-benzothiazolyl sulfenamide (NS), N-oxydiethylene-2-benzothiazolyl sulfenamide (MSA), N-tert-butyl-2-benzothiazolyl sulfenamide (NS), and N,N'-dicyclohexyl-2-benzothiazolyl sulfenamide (DZ). N-cyclohexyl-2-benzothiazolyl sulfenamide (CZ) is preferable.

Examples of the other sulfenamide-based vulcanizing accelerators without a secondary amine structure may include a thiazole-based vulcanizing accelerator such as 2-mercaptobenzothiazole (MBT), 2-benzothiazolyl disulfide (MBTS), zinc 2-mercaptobenzothiazole (ZnMBT), and a sodium salt of 2-mercaptobenzothiazole, a thiuram-based vulcanizing accelerator such as tetrabenzylthiuram disulfide (TBZTD) and tetrakis(2-ethylhexyl)thiuram disulfide, zinc tetrabenzyl dithiocarbamate, and 1,6-bis(N,N-dibenzylthiocarbamoyldithio)hexane. Tetrabenzylthiuram disulfide (TBZTD) is preferable.

In the case where a sulfenamide-based vulcanizing accelerator without a secondary amine structure and another vulcanizing accelerator without a secondary amine structure are used in combination, preferable examples of the combination may include N-cyclohexyl-2-benzothiazoryl sulfenamide (CZ) and tetrabenzylthiuram disulfide (TBZTD).

The amount of the vulcanizing accelerator falls within a range of 1 to 25 parts by weight, and preferably 6 to 12 parts by weight based on 100 parts by weight of the NBR polymer.

In the case where a sulfenamide-based vulcanizing accelerator and another vulcanizing accelerator are used in combination, the ratio of the sulfenamide-based vulcanizing accelerator to the other vulcanizing accelerator falls within a range of 1:1.0 to 2.0, and preferably 1:1.6 to 2.0. It is more preferably that the other vulcanizing accelerator be used together so that the amount of the sulfenamide-based vulcanizing accelerator falls within a range of 5 to 12 parts by weight, and preferably 5 to 8 parts by weight based on 100 parts by weight of the NBR polymer.

As carbon black, MT carbon black and carbon black having an iodine absorption number of 20 mg/g or less and a DBP absorption number of 40 $cm^3$/100 g or more are added together.

The carbon black having an iodine absorption number of 20 mg/g or less and a DBP absorption number of 40 $cm^3$/100 g or more may be used alone or in combination with two or more kinds. Preferable examples of commercial products thereof may include "SEAST TA" available from Tokai Carbon Co., Ltd., and "Asahi #51" available from ASAHI CARBON CO., LTD. "SEAST TA" and "Asahi #51" are classified into FT and SRF grades, respectively. In the present invention, it is important that the carbon black having an iodine absorption number of 20 mg/g or less and a DBP absorption number of 40 $cm^3$/100 g or more be used regardless of grade.

Carbon black having characteristics of an iodine absorption number of 20 mg/g or less and a DBP absorption number of 40 $cm^3$/100 g or more has an effect of improving abrasion resistance without deteriorating surface smoothness.

The amount of the carbon black falls with a range of 110 to 250 parts by weight, and preferably 160 to 220 parts by weight based on 100 parts by weight of the NBR polymer.

It is important that the amount of MT carbon black be larger than that of carbon black having an iodine absorption number of 20 mg/g or less and a DBP absorption number of 40 $cm^3$/100 g or more and the amount of the carbon black having an iodine absorption number of 20 mg/g or less and a DBP absorption number of 40 $cm^3$/100 g or more be 10 to 70 parts by weight, and preferably 30 to 50 parts by weight based on 100 parts by weight of the NBR polymer.

Even when the total amount of carbon black falls within a range of 110 to 250 parts by weight based on 100 parts by weight of the NBR polymer, a rubber metal laminate using carbon black having an iodine absorption number of 20 mg/g or less and a DBP absorption number of 40 $cm^3$/100 g or more in an amount less than 10 parts by weight (Comparative Example 1) has a lower flow resistance, and a rubber metal laminate using the carbon black in an amount more than 70 parts by weight (Comparative Example 2) has an uneven vulcanized surface. This is because components are unlikely to be dispersed by only a general kneader.

Further, when the amount of MT carbon black is less than that of carbon black having an iodine absorption number of 20 mg/g or less and a DBP absorption number of 40 $cm^3$/100 g or more (Comparative Example 4), a rubber metal laminate has an uneven vulcanized surface.

When the total amount of carbon black exceeds 250 parts by weight (Comparative Example 3), the abrasion resistance deteriorates. This is because the characteristics of rubber are unlikely to be expressed due to the volume of carbon black.

When MT carbon black is used in combination with carbon black other than one having an iodine absorption number of 20 mg/g or less and a DBP absorption number of 40 cm$^3$/100 g or more, desired abrasion resistance cannot be obtained.

An NBR composition containing carbon black such as FEF and HAF has increased surface roughness, and therefore the composition cannot be molded by vulcanizing in an oven.

To an NBR composition containing the components described above as essential components, other required blending agents are appropriately added.

As an inorganic filler, white carbon, silica, basic magnesium carbonate, activated calcium carbonate, special calcium carbonate, magnesium silicate super fine powder, hard clay, barium sulfate, talc, graphite, mica, kaolin, and calcium silicate may be used alone or in combination.

The addition of the inorganic filler is useful in the prevention of separation of an adhesive layer during immersion at high temperature and exhibits an effect of improving water resistance. Examples of white carbon include dry process silica produced by thermal decomposition of halogenated silicic acids or organosilicon compounds, a method of thermally reducing silica sand and air oxidizing the gasified SiO and wet process silica produced by thermal decomposition of sodium silicate. Amorphous silica can be used, and commercial products, for example, Nipsil LP (a product of Nippon Silica Kogyo) can be used as it is. Silica having a specific surface area of about 20 to 200 m$^2$/g, and preferably about 30 to 100 m$^2$/g can be usually used.

As silica, natural silica having an average particle diameter of about 20 μm or less, and preferably natural silica surface-treated with a silane coupling agent can be used to obtain the same effect.

White carbon has lower abrasion resistance as compared with generally used carbon black which is at a reasonable price and has excellent handling and abrasion resistance, but can improve the adhesion to an adhesive.

The inorganic filler can be used in a proportion of about 3 to 100 parts by weight, and preferably about 10 to 80 parts by weight based on 100 parts by weight of the NBR polymer.

As an age resistor, the general commercial products can be used depending on a crosslinking (vulcanization) system.

In addition to the components described above, various blending agents usually used in the rubber industry, for example, a processing aid such as stearic acid and paraffin wax, and an acid acceptor such as zinc oxide and magnesium oxide can be appropriately added.

The NBR composition of the present invention is prepared by kneading by a kneader such as an intermix, a pressure type kneader, or a Banbury mixer, or an open roll mill.

In order to use the NBR composition of the present invention as a rubber layer of a rubber metal laminate, raw materials are not kneaded or are partly kneaded by a kneader such as an intermix, a kneader, or a Banbury mixer, or an open roll mill, the materials are dissolved or dispersed in a solvent having a boiling point of 250° C. or lower, such as aromatic hydrocarbons and ketones, or a mixture thereof to prepare the NBR composition as a coating solution.

<Rubber-Metal Laminate>

The rubber metal laminate of the present invention can be obtained by forming a rubber layer from the NBR composition of the present invention on one or both faces of a metal plate through a primer layer and an adhesive layer if necessary.

A metal plate is not particularly limited, and a metal plate such as a stainless steel plate (ferrite stainless steel, martensite stainless steel, austenite stainless steel plate), an SPCC steel plate (cold rolled steel plate), or an aluminum steel plate can be used.

Further, a metal plate having a surface roughened by shot blast, scotch blast, hair-line, or dull finish can be used.

A primer layer is preferably formed on the metal plate. The primer layer is expected to significantly improve the heat resistance and water resistance relating to the rubber adhesion of the rubber metal laminate. Therefore, in the use of the rubber metal laminate as a gasket material, it is desirable to form the primer layer.

As the primer layer, a zinc phosphate coating, an iron phosphate coating, a chromate coating, an inorganic coating of metal compounds such as vanadium, zirconium, titanium, molybdenum, tungsten, manganese, zinc, or cerium, particularly oxides of the metal compounds, an organic coating of silane, phenolic resin, epoxy resin, or polyurethane, or the like can be used.

In the present invention, as the metal plate, a metal plate which is degreased by alkaline degreasing treatment or the like, and then subjected to chromate or chromate-free corrosion protection to form a corrosion protection coating is preferably used. On an SPCC steel plate, a zinc phosphate coating, an iron phosphate coating, or a coating similar to them may be formed.

For a gasket material, a metal plate having a thickness of about 0.1 to 1 mm, and preferably about 0.2 to 0.8 mm, is preferably used.

An adhesive can be produced by dissolving a binder resin, a vulcanizing agent, a vulcanizing accelerator, and a rubber composition for an unvulcanized adhesive through the ordinary method. An adhesive solution is applied to the metal plate to form an adhesive layer.

As the binder resin, one or more resins selected from phenolic resin, epoxy resin, and xylene resin are preferably used in combination.

Examples of phenolic resin may include any thermosetting phenolic resins such as cresol novolac type, cresol resol type, and alkyl-modified type phenolic resins.

Typical examples of epoxy resin may include cresol novolac modified epoxy resin. As a curing agent and a curing catalyst thereof, bisphenol novolac type phenolic resin and an imidazole compound, respectively, are suitably used.

Examples of xylene resin may include any modified xylene resins such as phenol-modified xylene resin.

As the vulcanizing agent of the adhesive, hexamethylenetetramine or the like is preferably used, and as the vulcanizing accelerator, 2-ethyl-4-methylimidazole or the like is preferably used.

As the rubber composition for the adhesive, NBR and HNBR rubber compositions are used. The rubber composition may contain NBR or HNBR having a nitrile content of 18 to 48%, carbon black, an inorganic filler, zinc oxide, sulfur, or an organic peroxide, a vulcanizing accelerator, or a crosslinking agent.

The organic solvent is not limited as long as the binder resin, the vulcanizing agent, the vulcanizing accelerator, and the rubber composition for an unvulcanized adhesive can be dissolved. Examples thereof may include aromatic hydrocarbons such as toluene, ketone-based solvents such as methyl ethyl ketone and methyl isobutyl ketone, alcohol-based organic solvents such as isopropyl alcohol, and a mixed solvent containing two or more kinds thereof.

The adhesive solution is prepared by using the organic solvent so that the solid concentration is 0.5 to 20%, and is applied to a metal plate, and preferably a metal plate having a primer layer. The adhesive solution is air-dried at room temperature, and dried at about 100 to 250° C. for about 5 to 30 minutes (or may be subjected to vulcanizing reaction) to form an adhesive layer.

The adhesive layer can be not only in a monolayer structure, but also in a multilayer structure. For example, a phenolic adhesive layer containing an organometallic compound is formed on the primer layer, and a phenolic adhesive layer containing the nitrile rubber composition is further formed thereon to apply a multilayer of the adhesives to the layer, forming a rubber layer. The multilayer structure can increase the number of coating process for the adhesive layer and further enhance the adhesion of the primer layer and the rubber layer.

The NBR composition of the present invention is dissolved in the organic solvent to produce a coating solution. The coating solution is applied to a metal plate, and preferably an adhesive layer formed on a metal plate, and vulcanized in an oven to form a rubber layer.

Raw materials are not kneaded or are partly kneaded by a kneader such as an intermix, a kneader, or a Banbury mixer, or an open roll mill, the materials are dissolved or dispersed in an organic solvent to prepare the NBR composition of the present invention as a coating solution.

The organic solvent is not limited as long as the NBR composition can be dissolved. The NBR composition is dissolved in a mixed solvent of two or more kinds of solvents including aromatic hydrocarbons such as toluene and ketone-based solvents such as methyl ethyl ketone and methyl isobutyl ketone to prepare a coating solution having a solid concentration of 25 to 50%.

The coating solution is applied so that the dried thickness is 20 to 150 μm.

Examples of coating methods may include roll coating, die coating, knife coating, and partial coating by screen printing, dispenser, or ink jet printing. The coating solution is prepared so as to have a viscosity suitable for each coating method. For example, in the roll coating, the viscosity is preferably 2,000 to 5,000 mPa·s, and the solid concentration is appropriately adjusted according to atmospheric temperature and solution temperature.

The NBR composition is vulcanized by treatment in heated air (vulcanizing in an oven) at 150 to 250° C. for 10 seconds to 10 minutes.

In order to prevent stickiness on a rubber surface after vulcanizing if necessary, a solid release agent such as paraffin wax, graphite, polyethylene, PTFE, and cellulose fibers is laminated via a binder.

The obtained rubber metal laminate (gasket material) is processed into a desired shape, for example by a punch, and the processed laminate can be suitably used as a gasket.

EXAMPLES

Hereinafter Examples of the present invention will be described. The present invention is not limited to Examples.

Example 1

NBR Composition

| | |
|---|---|
| NBR ("N237" available from JSR, nitrile content: 34%): | 100 parts by weight |
| MT carbon black ("THERMAX N990" available from Cancarb Ltd.): | 150 parts by weight |
| Carbon black having an iodine absorption number of 18 mg/g and a DBP absorption number of 42 cm$^3$/100 g ("SEAST TA" available from Tokai Carbon Co., Ltd.): | 40 parts by weight |
| Sulfur: | 2 parts by weight |
| Tetrabenzylthiuram disulfide ("NOCCELER TBZTD" available from Ouchi-Shinko Chemical Co., Ltd.): | 5 parts by weight |
| N-cyclohexyl-2-benzothiazolyl sulfonamide ("NOCCELER CZ" available from Ouchi-Shinko Chemical Co., Ltd.): | 9 parts by weight |
| Silica ("Aktisil VM 56" available from HOFFMANN MINERAL GmbH): | 30 parts by weight |
| Zinc oxide: | 5 parts by weight |
| Stearic acid: | 2 parts by weight |
| Age resistor ("Nocrac 224" available from Ouchi-Shinko Chemical Co.): | 5 parts by weight |

The above-described components were kneaded by a closed pressure type kneader and an open roll mill, and dissolved in a mixed solvent with a ratio of toluene to methyl ethyl ketone of 9:1 to prepare a coating solution having a solid concentration of 25% by weight.

Rubber-Metal Laminate

An adhesive layer was formed on a metal plate (SPCC) having a corrosion protection coating, and the coating solution was applied thereon so that the dried thickness was 100 μm, and was vulcanized in heated air (vulcanized in an oven) at 210° C. for 3 minutes to produce a rubber metal laminate (hereinafter sometimes referred to as gasket material). The rubber metal laminate was evaluated as follows.

1. Flow resistance: flow resistance of gasket material at high temperature and high pressure A stainless steel jig having a convex shape was used to apply a contact pressure of 200 MPa to the gasket material in a press heated to 150° C. After 10 minutes, the gasket material was evaluated on the basis of the following criteria.

(Evaluation Criteria)

Excellent: flow of rubber did not appear

Good: a little flow of rubber appeared, but exposure of metal plate did not appear. There was no practical issue.

Poor: rubber completely flowed, and metal plate was exposed.

2. Abrasion resistance: abrasion resistance of gasket material

The gasket material was subjected to Taber abrasion test (in accordance with JIS K6264) and the abrasion volume was measured. Abrasion resistance was evaluated in accordance with the following criteria.

(Evaluation Criteria)

Excellent: less than 0.2 cc

Good: 0.2 cc or more and less than 0.5 cc

Poor: 0.5 cc or more

3. Surface roughness: surface roughness of product formed of gasket material

An arithmetic average roughness Ra and a maximum roughness depth Ry on the surface of rubber layer of gasket material were measured (in accordance with JIS B0601) by a contact-type surface roughness measuring instrument ("SURFCOM" manufactured by TOKYO SEIMITSU CO., LTD.). Surface roughness was evaluated in accordance with the following criteria.

(Evaluation Criteria)

Excellent: arithmetic average roughness Ra was less than 0.3 μm and maximum roughness depth Ry was less than 2.2 μm Good: arithmetic average roughness Ra was 0.3 μm or more and less than 0.35 μm and maximum roughness depth Ry was 2.2 μm or more and less than 3.0 μm Poor: arithmetic average roughness Ra was 0.35 μm or more and maximum roughness depth Ry was 3.0 μm or more When the evaluation criterion is Excellent, surface smoothness is confirmed, and the gasket material adheres to the surface of a subject in an environment at a low contact pressure of 50 to 200 kPa and can seal the subject. Therefore, the gasket material is suitable. When the evaluation criterion is Poor, there are gaps on a sealing surface, and the gasket material cannot seal the subject. Therefore, the gasket material is not suitable.

4. Adhesion: resistance to refrigeration oil of gasket material, adhesion between metal and rubber layer after immersion in chlorofluorocarbon The obtained gasket material was immersed in a mixed solution of 50% by weight of refrigeration oil (PAG oil) used in a refrigerating machine and 50% by weight of chlorofluorocarbon (R134a) as a refrigerant, and allowed to stand at 150° C. for 150 hours. After a predetermined time, the gasket material was taken out the mixed solution, and the coating film was subjected to drawing test. The method and evaluation of the drawing test were in accordance with JIS K6894, and adhesion was evaluated in accordance with the following criteria.

(Evaluation Criteria)

Excellent: score was 5 (drawing is clear)

Good: score was 4

Poor: score was 3 or less (coating film is separated and drawing is not clear)

The results of the evaluations are shown in Table 1.

TABLE 1

(part by weight)

| | Example 1 | Example 2 | Example 3 | Example 4 | Example 5 | Example 6 |
|---|---|---|---|---|---|---|
| Nitrile rubber | 100 | 100 | 100 | 100 | 100 | 100 |
| MT Carbon black (THERMAX n990) | 150 | 150 | 150 | 150 | 150 | 210 |
| Carbon black (SEAST TA) | 40 | 40 | 40 | 10 | 70 | 10 |
| Sulfur | 2 | 2 | 2 | 2 | 2 | 2 |
| Tetrabenzylthiuram disulfide | 5 | 5 | 5 | 5 | 5 | 5 |
| N-cyclohexyl-2-benzothiazolyl sulfenamide | 9 | 5 | 12 | 9 | 9 | 9 |
| Silica | 30 | 30 | 30 | 30 | 30 | 30 |
| Zinc oxide | 5 | 5 | 5 | 5 | 5 | 5 |
| Stearic acid | 2 | 2 | 2 | 2 | 2 | 2 |
| Age resistor | 5 | 5 | 5 | 5 | 5 | 5 |
| Criteria | | | | | | |
| Flow resistance | Excellent | Good | Good | Good | Excellent | Good |
| Abrasion resistance | Excellent | Excellent | Excellent | Good | Excellent | Good |
| Surface roughness | Excellent | Excellent | Excellent | Excellent | Good | Excellent |
| Adhesion | Excellent | Excellent | Excellent | Excellent | Excellent | Good |

| | Example 7 | Comparative Example 1 | Comparative Example 2 | Comparative Example 3 | Comparative Example 4 |
|---|---|---|---|---|---|
| Nitrile rubber | 100 | 100 | 100 | 100 | 100 |
| MT Carbon black (THERMAX n990) | 90 | 150 | 150 | 250 | 50 |
| Carbon black (SEAST TA) | 70 | 0 | 100 | 10 | 70 |
| Sulfur | 2 | 2 | 2 | 2 | 2 |
| Tetrabenzylthiuram disulfide | 5 | 5 | 5 | 5 | 5 |
| N-cyclohexyl-2-benzothiazolyl sulfenamide | 9 | 9 | 9 | 9 | 9 |
| Silica | 30 | 30 | 30 | 30 | 30 |
| Zinc oxide | 5 | 5 | 5 | 5 | 5 |
| Stearic acid | 2 | 2 | 2 | 2 | 2 |
| Age resistor | 5 | 5 | 5 | 5 | 5 |
| Criteria | | | | | |
| Flow resistance | Excellent | Poor | Excellent | Good | Good |
| Abrasion resistance | Excellent | Good | Good | Poor | Good |
| Surface roughness | Good | Excellent | Poor | Excellent | Poor |
| Adhesion | Excellent | Excellent | Good | Good | Excellent |

Example 2

A rubber metal laminate was obtained in the same manner as in Example 1 except that the amount of vulcanizing accelerator "NOCCELER CZ" was changed to 5 parts by weight.

Example 3

A rubber metal laminate was obtained in the same manner as in Example 1 except that the amount of vulcanizing accelerator "NOCCELER CZ" was changed to 12 parts by weight.

Example 4

A rubber metal laminate was obtained in the same manner as in Example 1 except that the amount of "SEAST TA" was changed to 10 parts by weight.

Example 5

A rubber metal laminate was obtained in the same manner as in Example 1 except that the amount of "SEAST TA" was changed to 70 parts by weight.

Example 6

A rubber metal laminate was obtained in the same manner as in Example 1 except that the amounts of MT carbon black and "SEAST TA" were changed to 210 parts by weight and 10 parts by weight, respectively.

Example 7

A rubber metal laminate was obtained in the same manner as in Example 1 except that the amounts of MT carbon black and "SEAST TA" were changed to 90 parts by weight and 70 parts by weight, respectively.

Comparative Example 1

A rubber metal laminate was obtained in the same manner as in Example 1 except that the "SEAST TA" was not added.

Comparative Example 2

A rubber metal laminate was obtained in the same manner as in Example 1 except that the amount of "SEAST TA" was changed to 100 parts by weight.

Comparative Example 3

A rubber metal laminate was obtained in the same manner as in Example 1 except that the amounts of MT carbon black and "SEAST TA" were changed to 250 parts by weight and 10 parts by weight, respectively.

Comparative Example 4

A rubber metal laminate was obtained in the same manner as in Example 1 except that the amounts of MT carbon black and "SEAST TA" were changed to 50 parts by weight and 70 parts by weight, respectively.

The rubber metal laminates of Examples 2 to 7 and Comparative Examples 1 to 4 were also evaluated in the same manner as in Example 1. The results of the evaluations are shown in Table 1.

INDUSTRIAL APPLICABILITY

The NBR composition according to the present invention is suitably used as a vulcanizing molding material for oil sealings, gaskets, and o-rings, which needs abrasion resistance and the like. The rubber metal laminate according to the present invention is suitably used as a gasket for compressors of car air-conditioner, an engine gasket, or the like.

The invention claimed is:

1. An NBR composition comprising an acrylonitrile-butadiene rubber (NBR) polymer, a vulcanizing agent, a vulcanizing accelerator, and carbon black, wherein the carbon black includes a combination of medium thermal (MT) carbon black and at least one kind of carbon black selected from carbon black having an iodine absorption number of 20 mg/g or less and a dibutyl phthalate (DBP) absorption number of 40 cm$^3$/100 g or more, and the MT carbon black and the carbon black having the iodine absorption number of 20 mg/g or less and the DBP absorption number of 40 cm3/100 g or more are added in a total amount of 110 to 250 parts by weight based on 100 parts by weight of the NBR polymer, the amount of the MT carbon black is larger than the carbon black having an iodine absorption number of 20 mg/g or less and a DBP absorption number of 40 cm$^3$/100 g or more, and the amount of the carbon black having an iodine absorption number of 20 mg/g or less and a DBP absorption number of 40 cm$^3$/100 g or more is 10 to 70 parts by weight based on 100 parts by weight of the NBR composition and a vulcanizing agent is sulfur.

2. The NBR composition according to claim 1, wherein the total amount of the carbon black is 160 to 220 parts by weight based on 100 parts by weight of the NBR polymer.

3. The NBR composition according to claim 2, wherein the vulcanizing accelerator is selected from the group consisting of (1) or (2);
   (1) one or more kinds selected from sulfenamide-based vulcanizing accelerators, or
   (2) one or more kinds selected from sulfenamide-based vulcanizing accelerators and one or more kinds selected from the group consisting of a thiuram-based vulcanizing accelerator, a thiazole-based vulcanizing accelerator, zinc tetrabenzyldithiocarbamate or 1,6-bis(N,N-dibenzylthiocarbamoyldithio)hexane.

4. The NBR composition according to claim 3, wherein the sulfenamide-based vulcanizing accelerator is selected from the group consisting of N-cyclohexyl-2-benzothiazolyl sulfenamide, N-tert-butyl-2-benzothiazolyl sulfenamide, N-oxydiethylene-2-benzothiazolyl sulfenamide, N-tert-butyl-2-benzothiazolyl sulfenamide, or N,N'-dicyclohexyl-2-benzothiazolyl sulfenamide, the thiuram vulcanizing accelerator is selected from the group consisting of tetrabenzyl thiuram disulfide or tetrakis(2-ethylhexyl)thiuram disulfide, and the thiazole-based vulcanizing accelerator is selected from the group consisting of 2-mercaptobenzothiazole, 2-benzothiazolyl disulfide, zinc 2-mercaptobenzothiazole, or a sodium salt of 2-mercaptobenzothiazole.

5. A rubber metal laminate having a rubber layer formed onto one or both sides of a metal plate by using the NBR composition according to claim 2 as a rubber layer-forming component.

6. A rubber metal laminate having a rubber layer formed onto one or both sides of a metal plate by using the NBR composition according to claim 3 as a rubber layer-forming component.

7. A rubber metal laminate having a rubber layer formed onto one or both sides of a metal plate by using the NBR composition according to claim 4 as a rubber layer-forming component.

8. The NBR composition according to claim 1, wherein the vulcanizing accelerator is selected from the group consisting of (1) or (2);

(1) one or more kinds selected from sulfenamide-based vulcanizing accelerators;
(2) one or more kinds selected from sulfenamide-based vulcanizing accelerators and one or more kinds selected from the group consisting of a thiuram-based vulcanizing accelerator, a thiazole-based vulcanizing accelerator, zinc tetrabenzyldithiocarbamate or 1,6-bis(N,N-dibenzylthiocarbamoyldithio)hexane.

9. The NBR composition according to claim 8, wherein the sulfenamide-based vulcanizing accelerator is selected from the group consisting of N-cyclohexyl-2-benzothiazolyl sulfenamide, N-tert-butyl-2-benzothiazolyl sulfenamide, N-oxydiethylene-2-benzothiazolyl sulfenamide, N-tert-butyl-2-benzothiazolyl sulfenamide, or N,N'-dicyclohexyl-2-benzothiazolyl sulfenamide, the thiuram vulcanizing accelerator is selected from the group consisting of tetrabenzyl thiuram disulfide or tetrakis(2-ethylhexyl)thiuram disulfide, and the thiazole-based vulcanizing accelerator is selected from the group consisting of 2-mercaptobenzothiazole, 2-benzothiazolyl disulfide, zinc 2-mercaptobenzothiazole, or a sodium salt of 2-mercaptobenzothiazole.

10. A rubber metal laminate having a rubber layer formed onto one or both sides of a metal plate by using the NBR composition according to claim 8 as a rubber layer-forming component.

11. A rubber metal laminate having a rubber layer formed onto one or both sides of a metal plate by using the NBR composition according to claim 9 as a rubber layer-forming component.

12. A rubber metal laminate having a rubber layer formed onto one or both sides of a metal plate by using the NBR composition according to claim 1 as a rubber layer-forming component.

* * * * *